United States Patent Office 3,808,322
Patented Apr. 30, 1974

3,808,322
PROCESS FOR THE RECOVERY OF SODIUM FLUORIDE FROM WASTE FLUORIDIC MATERIAL AND PREPARATION OF $Na_3FeF_6$
Hung-Kei H. Lam, Walnut Creek, and Nazeeh Jamil Samawi, Livermore, Calif., assignors to Kaiser Aluminum & Chemical Corporation, Oakland, Calif.
No Drawing. Filed June 14, 1973, Ser. No. 370,004
Int. Cl. C01d 3/02; C01g 49/10
U.S. Cl. 423—185                         5 Claims

ABSTRACT OF THE DISCLOSURE

Sodium fluoferrate ($Na_3FeF_6$), a fluorinating agent for converting chloroalkanes to chlorofluoroalkanes, is prepared in high purity from spent, carbonaceous fluorine-containing linings of aluminum reduction cells. The spent lining, is, after comminution, subjected to controlled calcination and the residue is then selectively leached to recover substantially pure NaF solution. Adjustment of the pH precipitates residual $Na_3AlF_6$ impurities and the filtrate is directly used for the preparation of $Na_3FeF_6$ by addition of $FeCl_3$ and NaCl.

BACKGROUND OF THE INVENTION

Sodium fluoferrate ($Na_3FeF_6$) has been recently found to be an effective fluorinating agent for the fluorination of chloroalkanes, such as chloroform and carbon tetrachloride. Its suitability as a fluorinating agent, apart from the capability of readily exchanging its fluorine content to chlorine, is further enhanced by the easy manner in which the exhausted fluorinating agent can be directly regenerated without any intermediate purification steps. These advantages render sodium fluoferrate a versatile and highly desirable fluorinating agent, particularly when used to fluorinate lower chloroalkanes, generally those having one or two carbon atoms.

Preparation of sodium fluoferrate generally proceeds according to the following equation:

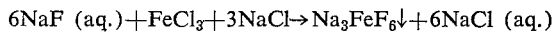

6NaF (aq.)+$FeCl_3$+3NaCl→$Na_3FeF_6$↓+6NaCl (aq.)

where as source of fluorine, sodium fluoride is employed. For the economic preparation of sodium fluoferrate it is desirable to obtain the NaF component of the fluoferrate not only from a readily available source, but also in high purity. Surprisingly, it has been found that the spent, carbonaceous linings of aluminium reduction cells provide such an economic and high purity source of sodium fluoride.

Conventional aluminum reduction cells employ a thermally insulated steel vessel lined on its side and bottom with carbonaceous materials, such as blocks of carbon cemented together with a carbon paste or lined with a rammed mixture of finely ground carbon and pitch. During operation of the cells, the carbonaceous lining is in contact with molten aluminum and cryolite and the temperature within the cell is generally at or above 900-950° C. Due to the high operating temperature and contact with the molten materials the lining is continually undergoing growth and disruption and final failure usually happens by penetration of the molten material in the lining. A that time the lining of the cell has to be removed. Spent furnace linings and bottoms can contain 10–25% by weight fluorine and often even higher quantities, for example up to about 30% by weight. An aluminum reduction plant of an annular capacity of about 200,000 tons can generate about 10–12,000 tons/year spent lining and from these figures it can readily be observed that this waste material is an excellent source of fluorine.

Several proposals have already been made for the recovery of fluorine values from spent linings. One of these proposals involves the pyrohydrolysis of the linings, and as it is described in Canadian Pat. 922,486 of Mar. 13, 1973, by Erik Q. Dahl, the particles obtained from the linings are suspended at a temperature of at least 1000° C. in a stream of steam to provide a fluidized bed. Under these conditions combustion of the carbon particles and decomposition of the fluoridic materials occur and the fluorine values are recovered from the vapor phase in the form of aqueous hydrofluoric acid. While this process allows recovery of about 85% of the fluorine present in the spent lining, the equipment and conditions under which the pyrohydrolysis is carried out, present considerable engineering problems in addition to the required conversion of HF to NaF.

Other conventional methods involve digestion of crushed pot lining with a dilute solution of alkali, generally NaOH, at or near the boiling point of the mixture. The resulting solution contains a large portion of the alumina values in the form of sodium aluminate ($NaAlO_2$) and sodium fluoride. The molecular ratio of NaF to $NaAlO_2$ is generally 6:1, which corresponds to the stoichiometric ratio of these constituents in cryolite ($Na_3AlF_6$). Upon acidification of the leachate, cryolite precipitates and the remaining solution, containing a very small quantity of NaF, becomes unsuitable for the recovery of NaF due to the low NaF concentration.

The instant process, which is directed to the recovery of NaF in high yield and purity from pot linings and the direct manufacture of sodium fluoferrate from the recovered NaF avoids the difficulties presented by the prior art processes. The process of the invention employs controlled calcination of the pot lining, which results in the conversion of water-soluble impurities to insoluble compounds, while at the same time water soluble NaF is produced. The calcination step employed allows oxidation of carbon, carbides, nitrides and cyanides to carbon dioxide and $N_2$, thus avoiding release of environmentally harmful components of the pot lining to the atmosphere. Simultaneously, during calcination the basic constituents of the pot lining, for example NaOH, $Na_2CO_3$ and $NaAlO_2$, react with the cryolite compounds of the pot lining forming substantially water insoluble compounds and thus making NaF available to an aqueous leaching step which follows the calcination step in the process of the invention. The aqueous NaF solution thus obtained can be used, after controlled adjustment of the pH, for the preparation of sodium fluoferrate.

SUMMARY OF THE INVENTION

A process for the recovery of sodium fluoride (NaF) from spent carbonaceous linings of aluminum reduction cells and production of sodium fluoferrate therefrom in high purity and yield which comprises subjecting the spent lining to a size reduction step, followed by calcination of the lining particles at 650°–900° C., with subsequent leaching of the fluoride values with water within the temperature range of 50° C. and the atmospheric boiling point of the aqueous slurry, wherein the water-to-solids ratio is kept between 5:1 and 20:1. After separation of the insoluble gangue, the filtrate is freed of residual impurities by adjustment of its pH to about 8.5–9.0, which causes precipitation of the small amount of soluble alumina in the leachate as $Na_3AlF_6$. Subsequent to removal of the precipitated impurities, the substantially pure NaF solution obtained is directly employed for the preparation of $NaFeF_6$ by addition of sufficient FeCl and NaCl at pH 7.0–8.0. The resulting $Na_3FeF_6$ can be employed as fluorinating agent for the conversion of chloroalkanes to chlorofluoroalkanes.

DETAILED DESCRIPTION OF THE INVENTION

This invention relates to a process for the recovery of fluorine values from spent, carbonaceous linings of aluminum reduction cells in the form of sodium fluoride and the direct preparation of sodium fluoferrate therefrom.

In accordance with the process of the present invention, the spent carbonaceous linings are at first subjected to a size reducing step. In this step the linings are crushed to an average particle size of about 0.04–1.00 mm. in size in conventional comminuting equipment, for example rotary crushers, hammer or ball mills. Subsequent to size reduction, the crushed spent lining is calcined in any suitable calciner, such as rotary kilns, multiple hearth furnaces, shaft furnaces or the like.

The temperature, at which the calcination of the lining particles is accomplished, is considered as a controlling factor in obtaining sodium fluoride in good yield and high purity. The temperature and length of the calcination should be at least sufficient to allow combustion of a significant quantity of the carbonaceous material. By significant quantity, at least about 70% by weight, preferably in excess of about 80% by weight carbonaceous material is understood. The upper limit of the calcination temperature is selected in a manner, so as to minimize the loss of fluorine values by means of volatilization. It has been found that these conditions are substantially met when the calcination temperature is selected to be within the range of about 650–900° C., preferably within the temperature limits of about 730° C. and 850° C. By controlling the calcination temperature within the limits disclosed, it can be achieved that no more than about 5% by weight, generally less than about 3% of the total fluoride content, becomes volatilized during the calcination.

Subsequent to the calcination step, the calcination residue is subjected to leaching with water. The calcined particles are then slurried with water, generally in the slurry, the water-to-calcined particle weight ratio is kept between about 5:1 and 20:1. Particularly good leaching results have been obtained when the water:calcined particle weight ratio is maintained between about 8:1 and 15:1. Lower water:calcined particle ratios, i.e. lower than 5:1, are to be avoided, due to solubility problems, since the solubility of NaF in aqueous medium is about 4.22 grams/100 ml. at 18° C., and if lower than 5:1 weight ratios are established a portion of the NaF may remain as a solid and becomes unavailable for extraction. Higher than 20:1 ratios can be used. However, the concentration of NaF will be significantly reduced, which can effect the economy of the sodium fluoferrate preparation. For best results the aqueous slurry is agitated during the leaching process and the temperature of the slurry is advantageously kept between about 50° C. and the boiling point of the slurry, at atmospheric pressure, preferably between about 75° C. and the atmospheric boiling point. Temperatures below about 50° C. slow down the leaching process. Naturally, the fluorine values of the calcined particles can be leached under pressure, for example, pressure vessels operating at about 10–100 p.s.i.g. can be readily employed.

The time period involved in the leaching step generally depends on the temperature utilized and also in some degree on the water-to-solids ratio of the slurry. The rate of extraction can be conveniently followed by periodic determination of the fluorine content of the aqueous medium. It has been found, that in case the calcined particles contained about 15–25% by weight fluorine and the temperature of the slurry was kept at about 100° C. (at atmospheric pressure), at a slurry solids content of about 8–12% by weight, a significant quantity of the fluorine content of the calcined lining, generally in excess of about 80% by weight could be extracted within 40–80 minutes. Naturally, variation of the slurry solids content and the temperature within the limits given above can accelerate or slow down the rate of extraction.

After the extraction step, the solid residue which is depleted in fluorine values is separated from the aqueous leachate. This separation can be conveniently carried out by any of the known methods, including gravity settling, filtration and/or centrifuging. The solid residue, which contains among others water insoluble salts, such as aluminates, cryolite, and metallic impurities, can be, if desired, processed for the recovery of these constituents. However, this is not considered to be within the scope of the present invention.

The filtrate which contains dissolved fluorine values, mainly in the form of sodium fluoride and a minor quantity of other water-soluble fluoridic salts, and sodium aluminate, is then purified to obtain a substantially pure NaF solution.

Purification of the filtrate is accomplished by adjustment of the pH of the filtrate to about 8.5–9.0 by addition of a small quantity of acidic material, generally HCl, $HNO_3$, or other acids. In order to avoid possible introduction of anionic impurities, which may interfere with the purity of the sodium fluoferrate final product, addition of HCl is preferred. Adjustment of the pH to the range indicated above removes as a precipitate any residual aluminum salt, usually sodium aluminate, in the form of cryolite ($Na_3AlF_6$). During pH adjustment the temperature of the NaF solution is advantageously maintained between about 20° and 90° C., the range of about 50° C. to 80° C. being preferred. Within the indicated temperature range, the degree of cryolite precipitation was found to be the most advantageous and the coprecipitation of NaF the least.

The precipitated impurities are then removed by conventional means, e.g. filtration, centrifuging or by gravity settling. The impurity-free NaF solution, having a purity of at least about 97%, generally in excess of about 99%, can then be directly employed for the preparation of sodium fluoferrate.

After determining the NaF content of the solution, sufficient $FeCl_3$ and NaCl is added to the solution to form sodium fluoferrate according to the equation shown above wherein the NaCl is recycled. For best results, the pH of the reaction mixture is adjusted to about 7.0–8.0 and the quantity of the $FeCl_3$ and NaCl to be added is selected to be at or about the stoichiometrically required amount. In other words, the quantity of $FeCl_3$ and NaCl to be added to the NaF solution is equal to 0.95–1.05 equivalents.

Under the above conditions, substantially pure $Na_3FeF_6$ precipitates, which after separation from the mother liquor and drying can be directly employed as a fluorinating agent for the conversion of chloroalkanes to chlorofluoroalkanes.

The following examples will further illustrate the process of the present invention.

EXAMPLE

Spent, carbonaceous aluminum reduction cell lining, containing about 16.0% by weight F was subjected to a size reducing operation by crushing in a conventional hammer mill to a particle size of about 0.04–0.30 mm. The crushed particles were then calcined in a multiple hearth furnace at a temperature within the range of about 730–800° C. After calcination, the calcination residue was analyzed with the following results (all percentages are given in weight percent): Al 23.3%, Na 24.75%, Si 0.90%, Ca 2.25%, Fe 2.40%, C 1.5% and F 20.2%. The fluorine value recovery at this stage amounted to 98.5%.

The calcination residue was then slurried with water in a water-to-solids weight ratio of 12:1 and the slurry was kept at boiling point temperature under agitation for a time period of about 55–65 minutes. Subsequently, the leachate was separated from the gangue material and both the filtrate and the gangue were analyzed. The filtrate contained Al 0.15 g./l., Na 18.8 g./l., Si 0.02 g./l., Fe 0.003 g./l. and F 14.0 g./l.; While the gangue contained Al 40.25%, Na 0.38%, Si 1.52%, Ca 3.90%, Fe 4.16%, F 4.16% and C 2.60% (all percentages by weight). The extraction resulted in a fluorine recovery in excess of 83% based on the fluorine contents of the lining.

The filtrate was then heated to about 50°–75° C. and HCl was added to adjust its pH to about 8.5–9.0 which caused precipitation of $Na_3AlF_6$ which was removed by filtration. The filtrate of the neutralization step was then analyzed with the following results: Al 0.01 g./l., Na 17.8 g./l., Si 0.021 g./l., Fe 0.003 g./l. and F 13.0 g./l. To this solution then sufficient HCl was added to adjust the pH to 7.0–8.0 and the solution was heated to about 25–50° C. For example, a pH of 7.5–8.0 may be employed. Stoichiometric quantities of $FeCl_3$ and NaCl were then added and the precipitated $Na_3FeF_6$ was recovered. The purity of the $Na_3FeF_6$ was in excess of 99.8% and the total fluorine recovery, calculated on the basis of the original fluoride content in the spent pot lining was in excess of about 80%.

What is claimed is:

1. A process for the recovery of sodium fluoride in aqueous solution from spent, carbonaceous fluorine-containing linings of aluminum reduction cells in high yield and in a purity suitable for the direct preparation of sodium fluoferrate which comprises:
   (a) comminuting the lining to a particle size between about 0.4–1.00 mm. and calcining the particles at a temperature from about 650° to about 900° C. for a time period sufficient to combust at least about 70% of the carbonaceous portion of the lining;
   (b) mixing the combustion residue with water, in a water to combustion residue weight ratio of 5–20:1, and leaching the mixture at a temperature between about 75° C. and the atmospheric boiling point of the mixture;
   (c) separating the aqueous phase from the leaching residue and adjusting the pH of the aqueous phase to about 8.5–9.0 to precipitate dissolved alumina values in the form of cryolite; and
   (d) recovering substantially pure aqueous sodium fluoride by removing the precipitated cryolite.

2. Process according to claim 1, wherein the water:combustion residue weight ratio is between about 8–15:1.

3. Process according to claim 1, wherein the pH of the substantially pure aqueous sodium fluoride is adjusted to about 7.0–8.0 and $FeCl_3$ and NaCl are added in an amount equal to about the stiochiometric to precipitate sodium fluoroferrate in high purity and yield.

4. Process according to claim 3, wherein the temperature of the aqueous sodium fluoride is kept between about 20° and 90° during pH adjustment.

5. Process according to claim 3, wherein the pH is adjusted to about 7.5–8.0.

References Cited
UNITED STATES PATENTS

| | | | |
|---|---|---|---|
| 2,732,283 | 1/1956 | Clukey | 423—465 X |
| 3,198,600 | 8/1965 | Mollard et al. | 423—465 X |

FOREIGN PATENTS

| | | | |
|---|---|---|---|
| 521,785 | 2/1956 | Canada | 423—465 |
| 196,644 | 6/1967 | U.S.S.R. | 423—465 |
| 6404420 | 10/1965 | Netherlands | 423—465 |

EDWARD STERN, Primary Examiner

U.S. Cl. X.R.

423——464, 490, 499

UNITED STATES PATENT OFFICE
CERTIFICATE OF CORRECTION

Patent No.  3,808,322          Dated April 30, 1974

Inventor(s) Hung-Kei H. Lam and Nazeeh Jamil Samawi

It is certified that error appears in the above-identified patent and that said Letters Patent are hereby corrected as shown below:

Column 1, Line 62, "A" should be --At--

Column 2, Line 65, "NaFeF$_6$" should be --Na$_3$FeF$_6$--

Column 2, Line 65, "FeCl" should be --FeCl$_3$--

Signed and sealed this 10th day of September 1974.

(SEAL)
Attest:

McCOY M. GIBSON, JR.                C. MARSHALL DANN
Attesting Officer                   Commissioner of Patents